US005138752A

United States Patent [19]

Tasner

[11] Patent Number: 5,138,752

[45] Date of Patent: Aug. 18, 1992

[54] O-RING POSITIONING TOOL

[75] Inventor: Timothy H. Tasner, N. Tonawanda, N.Y.

[73] Assignee: Glidden Machine & Tool, Inc., Tonawanda, N.Y.

[21] Appl. No.: 647,235

[22] Filed: Jan. 29, 1991

[51] Int. Cl.[5] ..... B23D 19/02

[52] U.S. Cl. ..... 29/235; 29/280

[58] Field of Search ..... 29/235, 270, 271, 278, 29/229, 280

[56] References Cited

U.S. PATENT DOCUMENTS 3,553,817 1/1971 Lallak ..... 29/235

4,571,804 2/1986 Grabler et al. ..... 29/235

*Primary Examiner*—J. J. Hartman

*Attorney, Agent, or Firm*—James J. Ralabate

[57] ABSTRACT

The tool of this invention is used to insert an O-ring into a cylindrical housing. Generally, the slot for seating an O-ring is internal of a housing and requires some manipulations to properly seat the ring. This invention provides a tool with an adjustable stop that limits the insertion of the tool to the exact location of the slot in the housing where the O-ring will seat. The tool has a loading assembly and a movable trigger assembly that properly loads, positions and moves the O-ring when appropriate.

4 Claims, 2 Drawing Sheets

Fig. 4
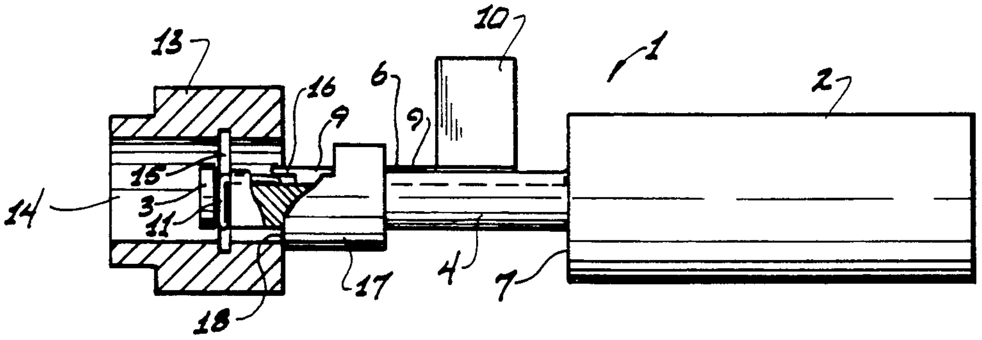
Fig. 5
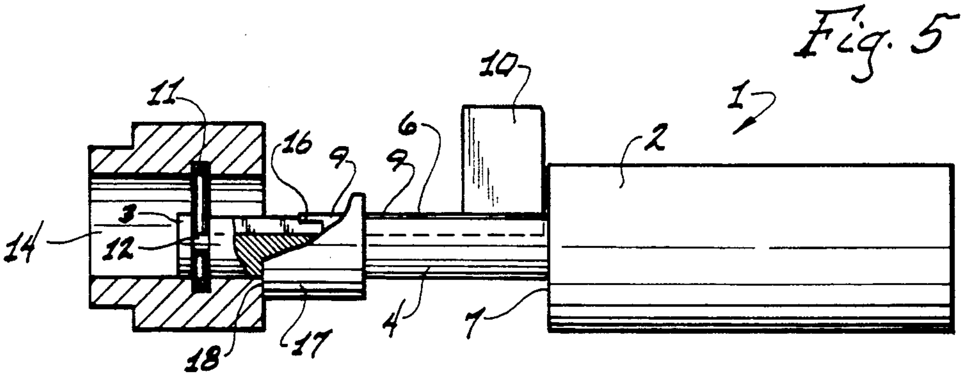
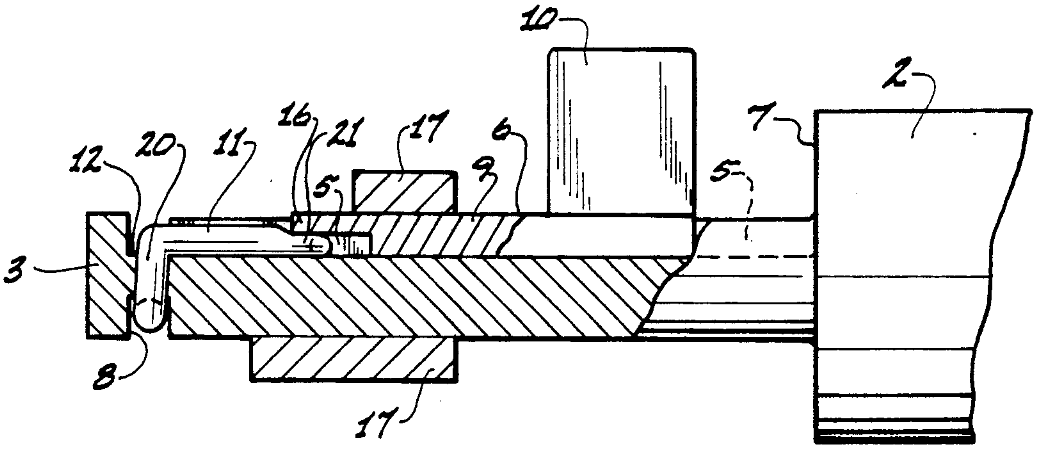
Fig. 6

O-RING POSITIONING TOOL

This invention relates to a tool for inserting O-rings in housings and, more particularly, to an O-ring dispensing and positioning tool that is easy to use in placing an O-ring internal of a housing.

BACKGROUND OF THE INVENTION

O-rings have been used to accomplish seals in various housings to prevent the passage of liquids or gases therethrough. Positioning the O-ring has been a problem especially in housings where the O-ring groove is to be seated is internal of the housing. The difficulty is to seat the O-ring in the proper position internally of any housing. Seating of O-rings to cylindrical parts to facilitate the proper sealing of these parts has been the object of several attempts in the past. U.S. Pat. Nos. 3,268,993 (Conner); 3,281,927 (Buslaff) and 4,821,398 (Hillstead) relate to the use of O-rings or similar rings in assemblies. In Conner a tool that applies locking rings externally to an assembly is described. Conner's locking ring illustrated in FIG. 13 of his patent is not elastic and his tool would be difficult to use for O-ring applications. Buslaff describes the use of a tool for expanding a tube or elastic assemblies for facilitating the subassembly with inelastic members of various devices. Buslaff's device is designed particularly for the dilation of the end portions of elastic tubes to permit their assembly with rigid annular or tubular parts that are to be tightly encircled by the end portions of the elastic tubes. Hillstead describes a tool that manufactures a sealed joint. Hillstead teaches that an O-ring is pushed onto an outer surface of a barrel member at the distal end of this barrel member. There is a need in the prior art for a simple device for the insertion of an O-ring internally of a tubular assembly.

SUMMARY OF THE INVENTION

It is therefore an object of this invention to provide an O-ring insertion tool devoid of the above-noted disadvantages.

Another object of this invention is to provide a tool for seating an O-ring seal internally of a tubular housing.

Still a further object of this invention is to provide a tool for inserting O-rings in a tubular housing that is easy to use and reliable and cost effective.

Yet another object of this invention is to provide an O-ring insertion tool that can be used by hand or can be automated in use.

Another still further object of this invention is to provide an O-ring insertion tool that is adjustable to fit most distances of insertion within a tubular member.

These and other objects of the invention are accomplished by a tool having a main handle portion for hand use. Extending upwardly from the handle is a stem portion that connects near its upper end with an adjustable stop. The stem is grooved to accommodate a slide or slidable trigger assembly. The top portion of the slidable trigger assembly is cut out to form a holding section to hold the O-ring when it is loaded onto the tool. At the terminal portion of the tool opposite to the handle is a retaining post or neck section having a cap at its end section. The O-ring is loaded onto the tool by placing it around the neck or retaining post and fitting the bottom section of the O-ring into the groove of the stem. The trigger assembly is moved forward (holding position) just far enough to hold the O-ring in place, the bottom of the O-ring locked in the holding section of the trigger assembly. The O-ring is now ready (after adjusting the adjustable stop) for insertion into a tubular housing or cylindrical part. The term "tubular housing" used throughout this disclosure will include any cylindrical part into which an O-ring can be seated. The tool is inserted into the tubular housing up to the front face of the adjustable stop while maintaining the trigger in its holding position. Once inserted the trigger assembly is pushed forward (toward cap) to release the O-ring from the tool and position it at the exact location in the tubular housing desired. The trigger assembly is then retracted all the way back against the upper face of the handle. The tool is held in place in the tubular housing and rotated to seat the O-ring into the groove of the tubular housing. The tool is then removed from the housing having properly seated the O-ring therein.

The tool can be constructed of any suitable material such as metals, plastics, wood or any other suitable composition. It is critical to the invention that the adjustable stop be locked into a position where its upper face is at a distance from the tool neck that is substantially identical to the distance of the groove in the tubular housing from the outer surface of the tubular housing. This is because the exact location of the groove and the O-ring on the tool are necessary for proper seating of the O-ring. While the description of the tool throughout this disclosure will be related to a hand-operated tool, it could be used in an automated system if desired.

BRIEF DESCRIPTION OF THE DRAWING

FIG. 4 is a side cutaway view of the loaded tool of this invention as it is inserted into the tubular housing during the O-ring seating operation.

FIG. 5 is a side cutaway view of the tool of this invention inserted into the tubular housing after it has seated the O-ring in its groove of the tubular housing.

FIG. 6 is an expanded side view of the tool of this invention having the O-ring in a loaded position.

DESCRIPTION OF THE DRAWING AND PREFERRED EMBODIMENT

Figure 1:
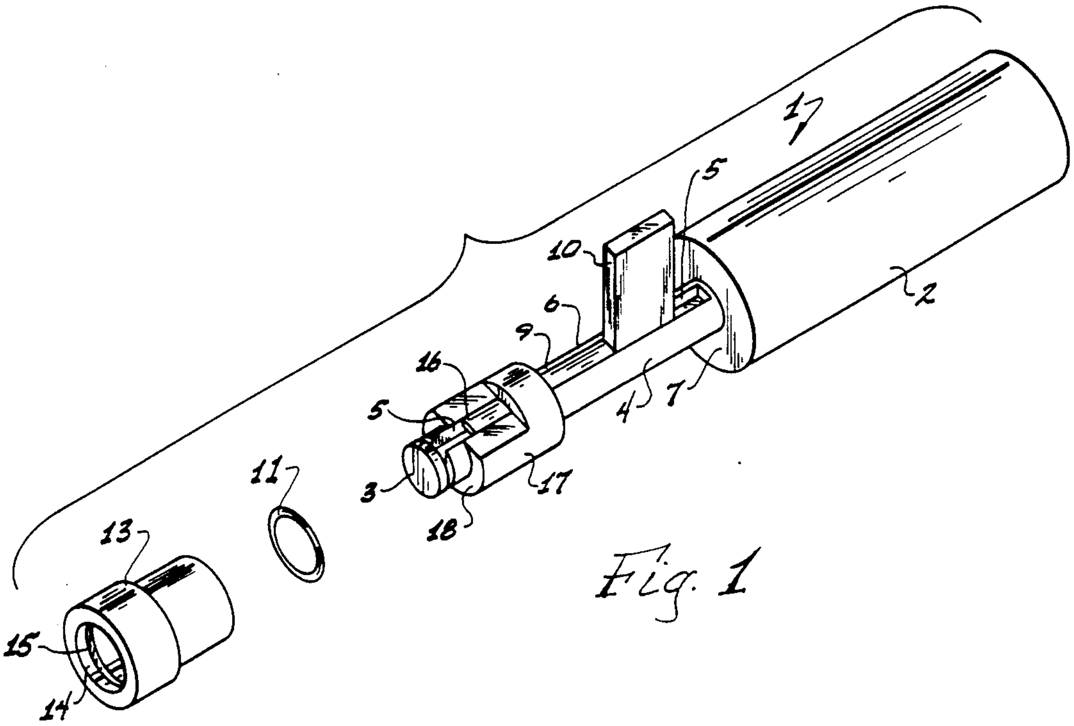
FIG. 1 is a perspective view of the tool of this invention, an O-ring and a tubular housing.
Figure 2:
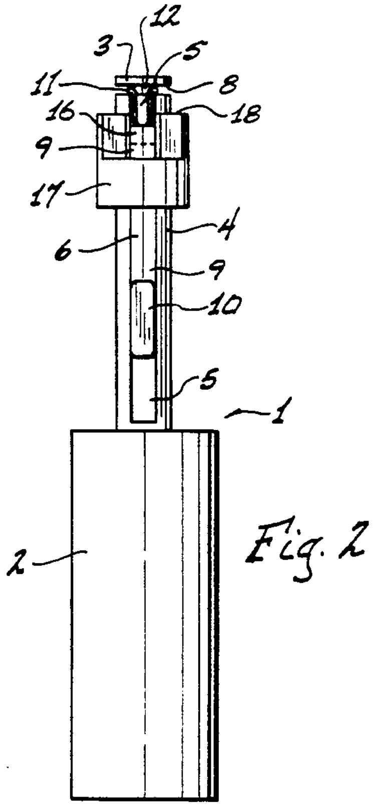
FIG. 2 is a front plan view of the tool of this invention with an O-ring loaded thereon.
Figure 3:
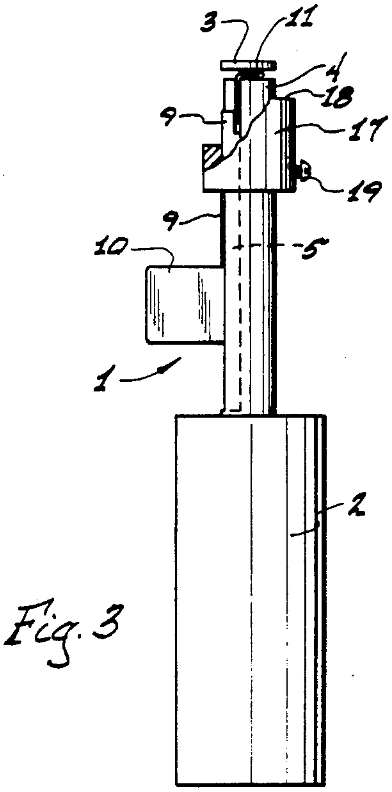
FIG. 3 is a side plan view of the tool of this invention with an O-ring loaded thereon.

In FIG. 1 the tool 1 of this invention comprises a handle means 2 located at one end of the tool and a cap 3 located at the opposite terminal end. Extending from the handle 2 toward the cap 3 is a stem 4 having a groove 5 into which a slidable trigger assembly 6 is located. The trigger assembly 6 will extend from the forward face 7 of the handle 2 and will be movable in groove 5 up to the bottom face 8 of cap 3. Trigger assembly 6 comprises a slidable stem 9 attached to an outwardly extending hand movable extension means 10. As will be illustrated in other figures herein, finger extension 10 is pushed forward and moved backward during the O-ring seating of FIGS. 4 and 5. Finger extension 10 is preferably fixed at right angles to slidable stem 9. An O-ring 11 which is elastic will eventually be fitted around the neck 12 of cap 3 and inserted into the groove 5 as shown in FIG. 2. A cylindrical housing 13 has an opening 14 into which tool 1 will be inserted during the O-ring seating. Housing 13 has an internal slot 15 (see FIGS. 4 and 5) into which the O-ring will be seated. At the front terminal portion (toward cap 3) of slidable stem 9 is a cutaway portion 16 which abuts the bottom part of the O-ring which is loaded onto, tool 1. The O-ring bottom part will be located between cutaway portion 16 and groove 5 when loaded as shown in FIGS. 2, 3, 4 and 6. Trigger assembly 6 is manually moved (toward cap 3) slightly to hold O-ring into cutaway portion 16. An annular adjustable stop 17 encircles stem 4 and has an L-shaped side configuration with a top or front portion 18 which fits against the outer face of housing 13 when positioning the O-ring. It is critical to the invention that the distance from top portion 18 to the neck 12 (containing the O-ring) be substantially equal to the distance slot 15 from the outer surface of housing 13. This is because when inserted into the housing 13 the distance of insertion will be stopped by the top portion 18 as shown in FIGS. 4 and 5. A screw or other adjusting means 19 is located in the side of adjustable stop 17 by loosening and tightening screw 19 adjustable stop 17 can be moved to the desired location around stem 4. In FIGS. 2 and, 3 the O-ring is pulled around neck 12 and inserted into the top section slot 5. The overhang or cutaway section 16 abuts the O-ring bottom part and holds the O-ring in a loaded position as shown in FIGS. 2, 3 and 6. With the trigger 6 all the way back (toward handle 2) the O-ring 11 is loaded onto the tool, the trigger 6 is moved forward just far enough to hold the O-ring 11 in place under overhang 16 as shown in FIGS. 2, 3 and 6. As shown in FIG. 4, the front end of tool 1 is inserted into the opening 14 of housing 13 and it is inserted up to front portion 18 allowing the O-ring 11 to be adjacent slot 15 where it is to be seated. The trigger assembly 6 is moved forward (toward cap 3) thereby locating the O-ring 11 in position in the housing 13. The trigger assembly 6 is then retracted back toward the handle and the tool 1 is rotated while in housing 13 to seat the O-ring in position into slot 15, then the tool 1 is removed from housing 13.

In FIG. 6 an expanded side view of tool 1 is shown having an O-ring 11 in a loaded position. The front or top portion 20 of O-ring 11 is fit around neck 12 and the remainder of O-ring 11 is manually stretched and pinched into groove 5 and tucked under cutaway portion 16. Cutaway portion 16 holds the bottom 21 of O-ring 11 in position while it is loaded. As slidable trigger assembly 6 and 10 is moved forward the upper section 22 of slidable stem 9 pushes the O-ring off the tool 1 (off the neck 12 and out of groove 5) into the cylindrical housing 13 to be seated therein. Finger extension 10 is pushed, forward, (toward cap 3) only slightly in order to locate the bottom section 21 of the O-ring in position. The overhanging section or cutaway portion 16 firmly holds the O-ring in groove 5 until the O-ring is deposited into the cylindrical assembly or housing 13; see FIGS. 4 and 5. As shown in FIG. 6, the sides of the O-ring are held in place by the groove 5.

The top 20 of the O-ring is held in place by cap 3 and neck 12 and the bottom 21 of the O-ring is held in place by stem overhang 16 during the loading operation. These same components guide the O-ring as it is pushed forward by the movement of finger extension 10 and stem 9 forward and eventually guide it into position into the slot 15 of housing 13 as shown in FIG. 5.

Thus the tool 1 of this invention has an O-ring loading section comprising a cap 3, neck 12 and a grooved stem 4. The O-ring 20 is placed around the cap 3 and encircles the neck 12 as shown in FIG. 6 and is tucked or squeezed into groove 5. Cutaway portion 16 is pushed forward over the lower part of O-ring 20 as shown in FIG. 6 to hold the O-ring 20 in position. The O-ring 20 is now ready to be inserted into a housing 13 as shown in FIG. 1. The tool 1 will fit into housing 13 to the position of adjustable stop 17. Once into housing 13 finger extension 10 is pushed forward thereby pushing stem 9 forward and thus releasing the O-ring 20 into place in housing 13.

What is claimed is:

1. A tool for inserting an O-ring into a tubular housing, said tool comprising in combination a handle portion, a stem, a grooved stem portion, a slidable trigger assembly, an adjustable stop, and an O-ring loading section, said slidable trigger assembly positioned in and movable within said grooved stem portion, a groove traversing substantially the length of said stem forming thereby said grooved stem portion, said groove located between and connecting said handle portion on one end and a cap on the opposite end, a forward portion of said trigger assembly has means to hold an O-ring in position when said O-ring is loaded around said cap on a forward portion of said grooved stem, said adjustable stop having means to locate a top face of said adjustable stop at a distance equal to the position said O-ring will be seated and deposited by said tool, said adjustable stop substantially encircling and is adjustable along an outer surface of said grooved stem and wherein said O-ring loading section comprises said cap, a groove in said grooved stem portion and said slidable trigger assembly.

2. The tool of claim 1 wherein said slidable trigger assembly has said overhand or cutaway section at its forward section, said cutaway section has means to hold one end of an O-ring in position when an opposite end of said O-ring is wrapped around a neck portion of said cap.

3. The tool of claim 1 wherein said trigger assembly has means to dislodge said O-ring from said tool into a tubular housing.

4. The tool of claim 1 wherein said trigger assembly has a hand movable means extending therefrom, said hand movable means used to move said trigger assembly forward or backward along said groove in said grooved stem portion.

* * * * *